E. FERRISS.
MACHINE FOR PLOWING OR OTHERWISE CULTIVATING THE SOIL.
APPLICATION FILED APR. 27, 1908.
901,605.
Patented Oct. 20, 1908.
3 SHEETS—SHEET 1.
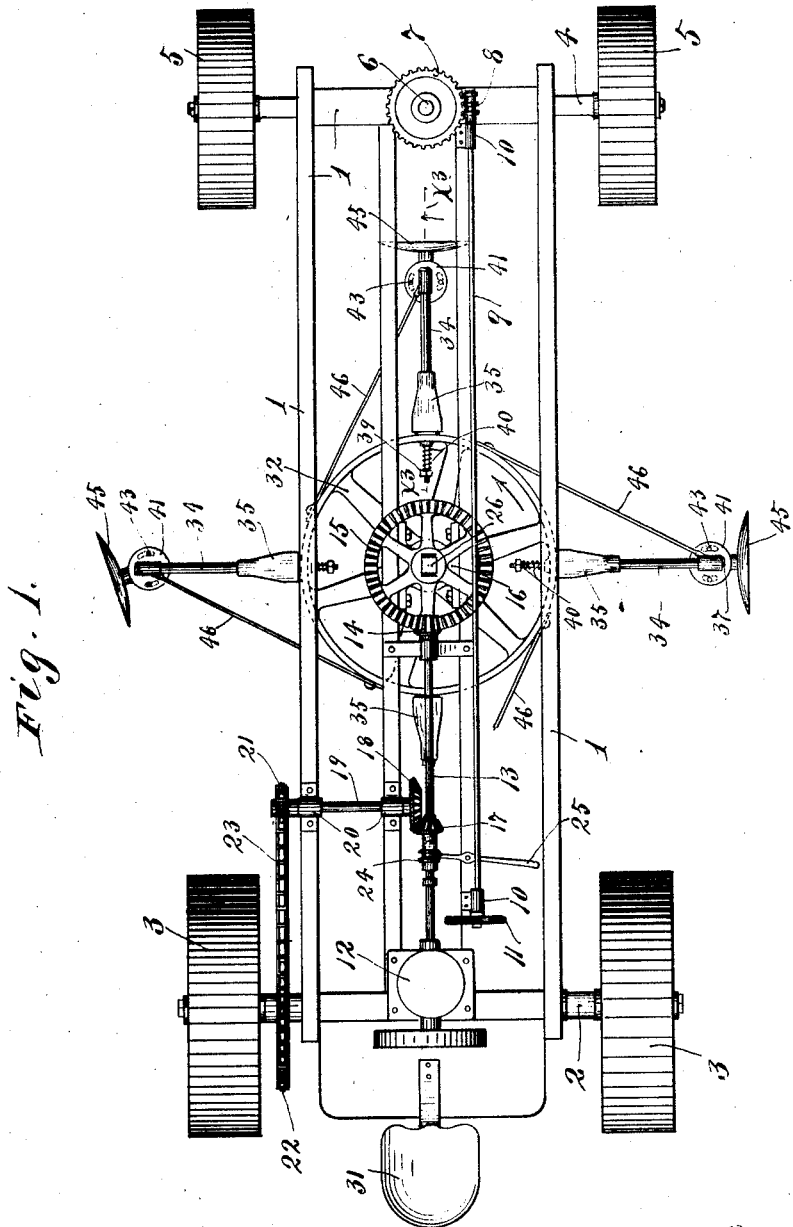
Witnesses
A. H. Opsahl.
U. H. Souba.
Inventor.
Edward Ferriss
By his Attorneys
William M. Merchant

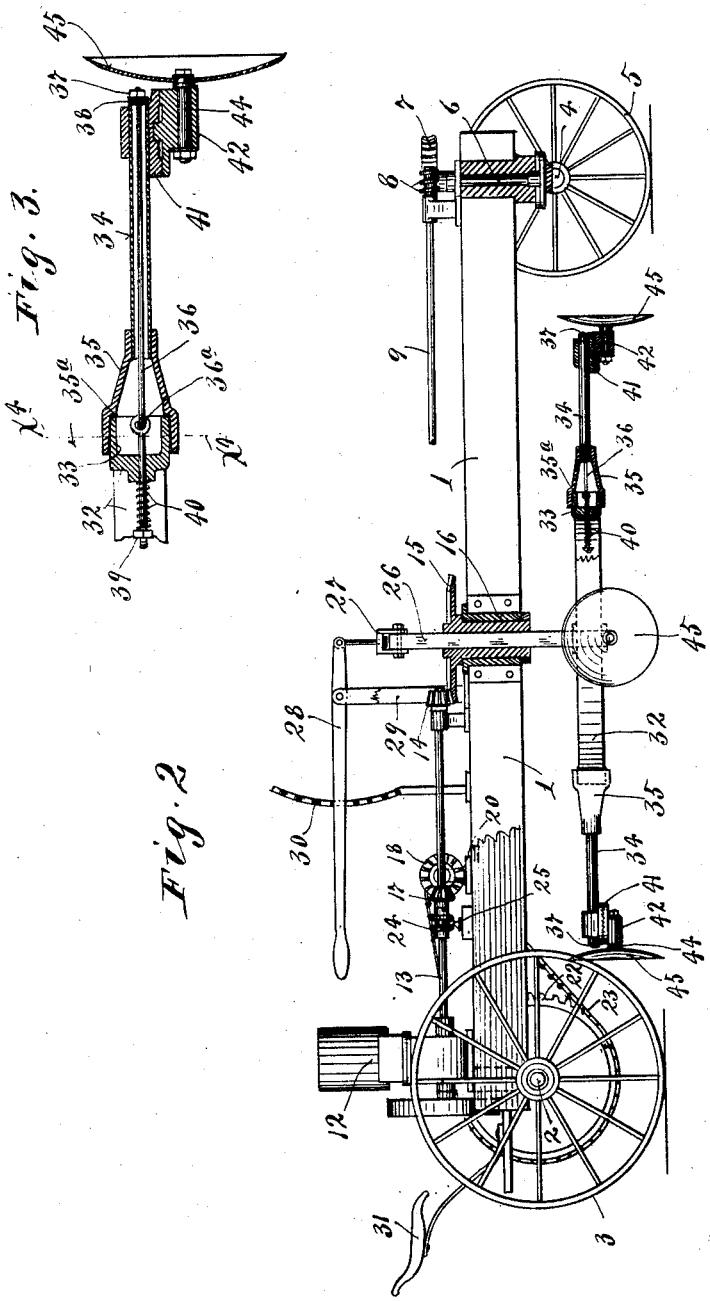

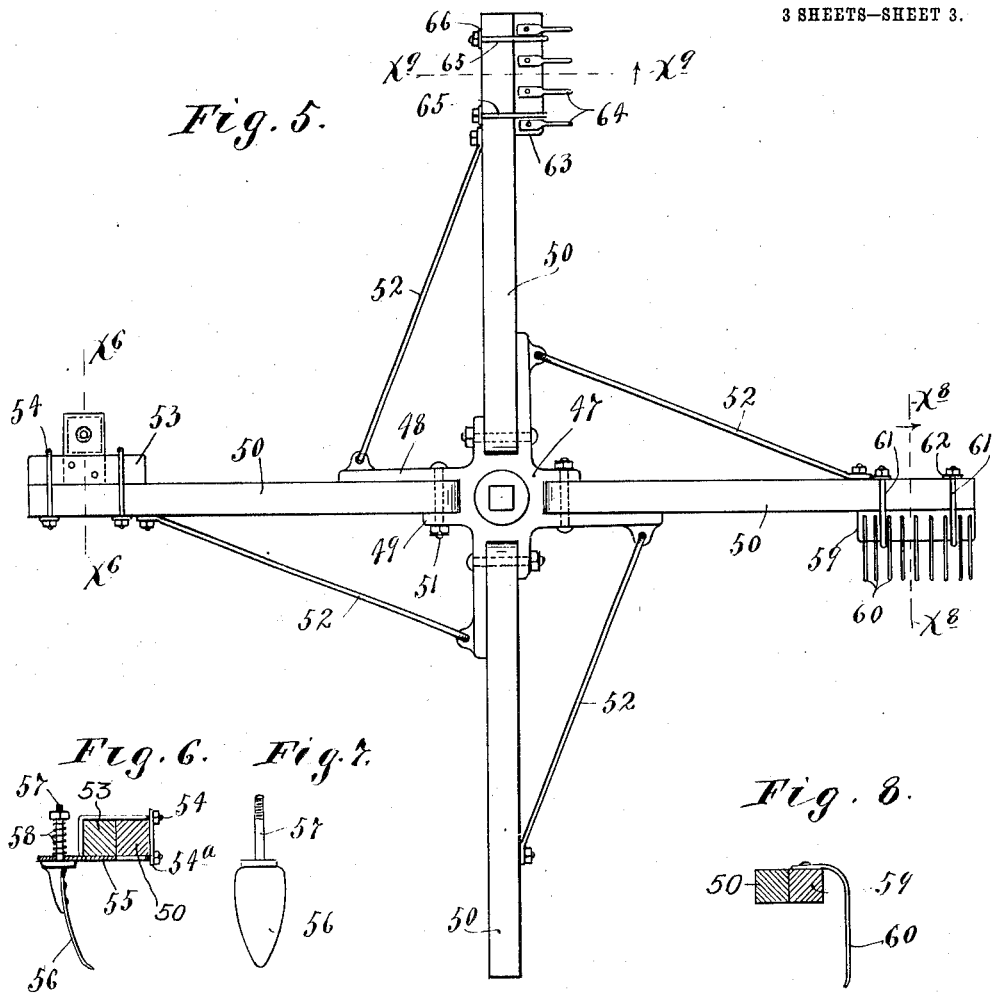

UNITED STATES PATENT OFFICE.

EDWARD FERRISS, OF NAPOLEON, NORTH DAKOTA.

MACHINE FOR PLOWING OR OTHERWISE CULTIVATING THE SOIL.

No. 901,605.  Specification of Letters Patent.  Patented Oct. 20, 1908.

Application filed April 27, 1908. Serial No. 429,492.

*To all whom it may concern:*

Be it known that I, EDWARD FERRISS, a citizen of the United States, residing at Napoleon, in the county of Logan and State of North Dakota, have invented certain new and useful Improvements in Machines for Plowing or Otherwise Cultivating the Soil; and I do hereby declare the following to be a full, clear, and exact description of the invention, such as will enable others skilled in the art to which it appertains to make and use the same.

Generally stated, my invention has for its object to provide an improved machine for plowing or otherwise cultivating the soil; and to this end it consists of the novel devices and combinations of devices hereinafter described and defined in the claims.

In the following description the term "ground working devices" is used in a broad sense to include disks, shovels, hoes, cultivator teeth, weeders, or any other devices which may be used for action on the ground to cultivate the soil, or to put the same in condition for seeding. In this improved machine, a traction truck is employed and the motive power for driving the same is carried by the truck; and the ground-working devices are carried by a rotatable support which is also preferably driven by the same engine or source of power which drives the traction wheels of the truck. These ground working devices are caused to rotate around an approximately vertical axis so that each passes twice over the same ground; and, under the forward advancing movement of the machine, cut or rake the ground on intersecting arcs, all as will be hereinafter more fully described.

In the accompanying drawings which illustrate the invention, like characters indicate like parts throughout the several views.

Referring to the drawings, Figure 1 is a plan view showing the improved machine, some parts being broken away. Fig. 2 is a side elevation of the improved machine, some parts being broken away and some parts being shown in vertical section, taken centrally and longitudinally through the machine. Fig. 3 is an enlarged vertical section taken on the line $x^3$ $x^3$ of Fig. 1. Fig. 4 is a detail in section on the line $x^4$ $x^4$ of Fig. 3. Fig. 5 is a plan view, illustrating a modified form of rotary support and several modified forms of the so-called ground working devices. Fig. 6 is a vertical section taken on the line $x^6$ $x^6$ of Fig. 5. Fig. 7 is a face view of the so-called "bull tongue" shown in Fig. 6. Fig. 8 is a vertical section taken on the line $x^8$ $x^8$ of Fig. 5; and Fig. 9 is a vertical section taken on the line $x^9$ $x^9$ of Fig. 5.

Figs. 1 to 4 inclusive show the arms of the rotating support equipped with disks which adapt the machine to operate as a plow, and this construction will first be described. The truck of the machine is made up of a suitable platform frame 1 having a rigidly secured rear axle 2 equipped with wheels 3 and provided with an oscillatory front axle 4 equipped with wheels 5. This front axle 4 is rigidly secured to the lower end of the vertical pintle 6 that is journaled in a suitable bearing in the front end of the platform frame 1 and provided at its upper end with a worm gear 7. The worm gear 7 meshes with a worm 8 secured to the front end of a long horizontal shaft 9 mounted in suitable bearings 10 on the frame 1, and, as shown, provided at its rear end with an operating wheel 11. By manipulation of the hand wheel 11 the worm and gear may be operated to impart such oscillatory movements to the axle 4 as will be required to properly steer the machine.

Mounted on the rear portion of the platform frame 1 is a motor in the form of an explosive engine 12, the extended crank shaft 13 of which is provided at its forward end with a bevel pinion 14 that meshes with a bevel gear 15, the depending sleeve-like hub of which is journaled in a heavy bearing 16 rigidly secured to the central portion of the platform frame 1. On the intermediate portion of the shaft 13 is another bevel pinion 17 that is held against axial movement but is otherwise loose on said shaft. This pinion 17 meshes with a bevel gear 18 secured at the inner end of a transverse counter-shaft 19 mounted in suitable bearings 20 on the platform frame 1 and provided at its outer end with a sprocket 21. The sprocket 21 alines with a relatively large sprocket 22 that is secured to the hub of one of the rear wheels 3. A sprocket chain 23 runs over the sprockets 21 and 22. Keyed for rotation with the engine shaft 13 but having a sliding movement thereon is a clutch sleeve 24 that has a half clutch arranged for engagement with the half clutch carried by the hub of the loose pinion 17. The clutch member 24 is adapted to be moved into and out of engagement with the clutch member of the pinion 17 by means of a shipper lever 25, shown as pivotally connected to one of the longitudinal beams of the platform frame 1. As is evident, by means of this lever 25 the engine may be coupled to and disconnected from the traction wheel, at will.

A heavy vertically disposed shaft 26 that is square or angular in cross section fits a correspondingly formed axle sleeve in the sleeve-like hub of the bevel gear 15 and is caused to rotate with the said gear, but is free for vertical sliding movements in respect to the same. The upper end of this shaft 26 is connected by a swivel-acting coupling 27, to the forward end of a raising and lowering lever 28, which lever is intermediately pivoted to a pedestal-like fulcrum 29 carried by the platform frame 1. This lever 28 is adapted to be held in any desired position by means of a notched segment or bar 30 secured at its lower end to the platform frame 1.

The numeral 31 indicates an operator's seat, supported at the rear end portion of the platform frame 1, from which position the operator may readily reach the levers 25 and 28 and the steering wheel 11 and may also readily control the machine.

Rigidly secured to the lower end of the vertically adjustable shaft 26 is a rotating support, preferably in the form of a wheel 32 made up of a hub, radial arms, and rim. This wheel or rotary support is preferably provided with four arms that extend radially outward therefrom and to the outer ends of which the ground working devices, in the present instance in the form of disks, are applied. To provide for the connection of these arms in their preferred form, the rim of the wheel 32 is provided at four equally spaced points with outwardly projecting rectangular or box-like bearings 33, and the radial arms 34 are provided at their inner ends with angular or box-like sockets 35 that fit over the respective bearings 33 with sufficient clearance to permit limited vertical and lateral movements of the said arms. As best shown in Fig. 3, the arms 34 are tubular and their sockets 35 are provided with shoulders 35ª that limit the inward movements of the said sockets on the respective bearings 33.

Tension rods 36 extend axially through the arms 34, sockets 35 and bearings 33 and also project through the rim of the wheel 32. The said rods 36 are jointed at 36ª, the said joints being located within the angular bearings 33. At their outer ends the rods 36 are provided with nuts or heads 37 that engage washers or plugs 38, which latter are pressed directly against the outer ends of the tubular arms 34. At their inner ends said rods 36 are provided with nuts 39, between which and the rim of the wheel 32 strong coiled springs 40 are compressed. These springs 40 exert a force which, acting through the rods 36, tend to hold the arms 34 in horizontal positions, extending on lines that radiate from the axis of the wheel 32. The said springs, however, permit the arms 34 to be moved vertically or otherwise out of such truly alined positions under certain conditions, hereinafter pointed out.

To the outer end of each arm 34 is rigidly secured a horizontally disposed bearing plate 41 to which a journal box 42 is pivotally secured, preferably by slot and bolt connections 43, which latter are shown only in Fig. 1. Short axles or trunnions 44, located below but extending parallel to the respective arms 34, are journaled in the respective journal-boxes 42. At their outer ends these axles or trunnions 44 have rigidly secured disks 45 that are preferably concavo-convex in form.

Tension rods or connections 46 connect the outer ends of the several arms 34 to points on the rim of the wheel 32 that are located forward thereof in respect to the direction of rotation of the said wheel, such directions of rotation being indicated by the arrow marked thereon in Fig. 1. These tension rods 46 take the chief strain incident to the forced rotary traveling movement of the disks while acting on the ground, and they have sufficient flexibility or looseness to permit limited vertical movements of the arms 34 when one of the disks is caused to run over a stone or other obstruction in the ground which can not be readily cut by the disk.

As is evident, by adjustments of the journal-boxes 42 the disks may be set at any desired angle in respect to the coöperating arms 34 and may thus be put in the best positions for the proper cutting action. By means of the lever 28 the wheel 32 may be vertically adjusted so as to simultaneously move the several disks from their raised or inoperative positions into lowered operative positions, or vice versa; and, with the same adjustments, the said disks may be set to cut through shallow or deep furrows in the ground. The furrow cut by the disks will, of course, be approximately circular; but, under the advance movement of the machine, the furrows cut by the disks when moving transversely of the forward portion of the machine will transversely intersect furrows cut by the disks while moving transversely of the rear portion of the machine. Furthermore, with the driving connections from a common engine, the disks will cut furrows of predetermined width, and each furrow cut will be crescent shaped, to-wit, will have a maximum width at the center of the machine and will diminish in width toward the opposite sides of the machine. As the ground is twice worked over by the disks it will be very thoroughly cut.

In the arrangement described, the disks are disposed at diametrically opposite points so that when two disks are acting at opposite sides of the machine the lateral thrust produced thereby on the machine will be neutralized. The machine, when provided with disks as above described, is especially adapted for use as a plow.

Figs. 5 to 9 inclusive illustrate a modified form of the rotary support and illustrate several different forms of ground working devices. These different forms of ground working devices might be applied to the outer ends of the arms 34 above described, but preferably when any of these devices are to be used the wheel 32 of the above described construction is removed and a hub 47 of special design is secured to the lower end of the shaft 26 as a substitute for the said wheel 32. This hub 47 is shown as provided with four long bearing lugs 48 and four coöperating short bearing lugs 49 and radially projecting arms 50, shown as in the form of wooden beams, are pivotally connected to the coöperating lugs 48—49 by bolts 51. The outer ends of the long lugs 48 are connected each to one of the arms 50 by a tension rod 52.

To the outer end of the left hand arm 50, as viewed in Fig. 5, a bearing block 53 is secured, preferably by nut equipped U-bolts 54 and clamping bars 54ª, and a bearing plate 55 is bolted to the said arm and block. A shovel or "bull tongue" 56 provided with a stem 57 is passed upward over the projecting end of the plate 55 and is yieldingly held in working position by a spring 58 applied to the said stem and plate. To the outer end of the right hand arm 50, as viewed in Fig. 5, is secured a weeder, shown as made up of a block 59 and depending spring teeth 60, which block is detachably secured to said arm by nut-equipped U-bolts 61 and clamping bars 62. To the outer end of the upwardly extended arm 50, as viewed in Fig. 5, is secured a harrow, made up of a block 63 and spring teeth 64, the said block being detachably secured to said arm by nut-equipped U-bolts 65 and clamping bars 66. No ground working device of any character is shown as applied to the downwardly extended arm 50 of Fig. 5. In practice, of course, two different kinds of ground working devices would seldom, if ever, be applied at the same time to the several arms 50, and it will, of course, be understood that the several different forms of the device are shown in Fig. 5 simply to save drawing.

What I claim is:

1. In a machine of the kind described, the combination with a truck, of a support connected to the intermediate portion of the truck frame for rotation around an approximately vertical axis, a multiplicity of arms flexibly connected to said support, and ground-working devices applied to the free outer ends of said arms.

2. In a machine of the kind described, the combination with a truck, of a support connected to the intermediate portion of the truck frame for rotary movement around an approximately vertical axis, a multiplicity of arms flexibly connected to said rotary support by telescoping angular bearings and sockets, spring pressed tension rods tending to hold said arms in radial positions in respect to said support, and ground-working devices applied to the free outer ends of said arms.

3. In a machine of the kind described, the combination with a truck, of a bevel gear having a vertical sleeve-like hub mounted in the bearing at the central portion of the truck frame, an engine carried by said truck, an engine driven shaft having a bevel pinion meshing with said bevel gear, a driving connection from said driven shaft to one of the truck wheels, an angular shaft arranged to move vertically through the hub of said bevel gear, a lifting lever and coöperating latch bar mounted on the truck frame, a swivel connection between said lever and the upper end of said angular shaft, a support secured to the lower end of said angular shaft, and a multiplicity of arms flexibly connected to said support and provided at their free outer ends with ground-working devices.

In testimony whereof I affix my signature in presence of two witnesses.

EDWARD FERRISS.

Witnesses:
HARRY D. KILGORE,
MALIE HOEL.